United States Patent [19]

Jacobson

[11] Patent Number: 5,357,894
[45] Date of Patent: Oct. 25, 1994

[54] PLEASURE WATERCRAFT

[76] Inventor: Clayton J. Jacobson, Box 5338 Elrb, Parker, Ark. 85344

[21] Appl. No.: 540,887

[22] Filed: Jun. 20, 1990

Related U.S. Application Data

[63] Continuation of Ser. No. 334,760, Apr. 6, 1989, abandoned, which is a continuation of Ser. No. 856,674, Apr. 25, 1986, abandoned.

[51] Int. Cl.$^5$ .............................................. B63B 1/16
[52] U.S. Cl. ................................... 114/272; 244/12.1
[58] Field of Search ............................. 114/271–273, 114/67 A; 244/105, 12.1; 440/37

[56] References Cited

U.S. PATENT DOCUMENTS

| | | | |
|---|---|---|---|
| Re. 30,978 | 6/1982 | Jacobson | 114/270 |
| 1,858,762 | 5/1932 | Bellanca | 244/55 |
| 2,272,661 | 2/1942 | Finley | 114/272 |
| 2,311,161 | 2/1943 | Dornier | 244/106 |
| 2,354,453 | 7/1944 | Gazda | 114/272 |
| 3,094,962 | 6/1963 | Goar | 114/271 |
| 3,176,647 | 4/1965 | Grengs et al. | 440/37 |
| 3,190,582 | 6/1965 | Lippisch | 244/12 |
| 3,627,235 | 12/1971 | Lippisch | 244/105 |
| 3,661,111 | 5/1972 | Lippisch | 114/67 A |
| 3,830,448 | 8/1974 | Lippisch | 244/2 |
| 3,952,678 | 4/1976 | Weston | 114/272 |
| 4,159,086 | 6/1979 | Schonfelder | 244/12.1 |
| 4,365,578 | 12/1982 | Schellhaas | 440/37 |

FOREIGN PATENT DOCUMENTS 422982  1/1935  United Kingdom ................ 114/272

OTHER PUBLICATIONS

Tim Cole, License to Fly, *Popular Mechanics* (Jul. 1989, pp. 57–59, 124–125).
Abe Dane, Wingships, *Popular Mechanics* (May 1992, pp. 35–38, 123).
Kevin Cameron, The Boat That Flies, *Popular Science* (Apr. 1992, pp. 57–60, 111).

*Primary Examiner*—Jesus D. Sotelo
*Attorney, Agent, or Firm*—Lyon & Lyon

[57] ABSTRACT

A pleasure watercraft is provided which comprises a hull, sponsons, and support structures for the sponsons which have a shape of an airfoil. A cockpit for seating a pilot in the hull is located such that the distribution of mass elements in the craft positions the center of gravity of the craft within a select range along the longitudinal axis of the hull in substantially vertical alignment with seating position of the pilot, and preferably beneath the pilot. Hydrodynamic and aerodynamic forces acting on the craft as it accelerates converge within the select range to permit the pilot control of the attitude and roll of the craft.

21 Claims, 3 Drawing Sheets

PLEASURE WATERCRAFT

This is a continuation of Ser. No. 07/334,760 filed Apr. 6, 1989, which is a continuation of Ser. No. 06/856,674 filed Apr. 25, 1986, both now abandoned.

FIELD OF THE INVENTION

The invention presented herein relates to a recreational watercraft and in particular to a watercraft having an aerodynamic configuration which improves transitional and high speed performance, and having a select arrangement of mass distribution to enable a pilot to control the attitude of the watercraft through control elements and the position of the pilots body.

BACKGROUND OF THE INVENTION

For many years, designers of pleasure craft have been researching water-borne craft designs which have aerodynamic elements generating lift force on the craft structure when at speed to assist raising the craft above its at rest buoyant draft. This is desired to reduce viscous drag on the craft hull providing increase speed and/or efficiency over a craft with a conventional design having the same weight and power. Early designs effectuating this objective are evidenced by the hydroplane style boat which comprises a pair of structurally supported sponsons separated by a raised hull floor, which form an underlying tunnel through which air is flowed. The underflowing airstream may also provide a lift force through the force of the airstream against the hull floor or through compression of the entering air mass between the water surface and the hull floor of the boat, or both.

The hull of a hydroplane is supported by buoyant force generally along its entire underside, including the hull floor and sponsons, when at rest. Under power the boat is substantially supported by hydrodynamic force acting against the outwardly and forwardly positioned sponsons, and by radial thrust from the prop extending from the rear of the null. This triangular footing provides good stability in smooth surfaces water, however, the wide beam of the sponsons and the airflow through the centrally defined tunnel can result in instability in rough surface conditions.

Generally, hydroplane style boats are designed with the cockpit in opposition to the powerplant, i.e. the cockpit is in the front if the engine is in the rear and vice versa, for heavier designs. For lighter designs, for instance boats under fifteen foot in length, the cockpit is generally positioned in the stern so that the pilot is within reach of an outboard type motor mounted to the transom of the boat.

Tri-hull boat designs exemplified for instance in U.S. Pat. No. 3,952,678, have been described as improvements over the basic hydroplane style hull. Such boat designs comprise a third water borne hull generally positioned centrally between the sponsons to assist in dynamic stability. The depths of the hull and sponsons are generally equal, as shown, to provide a uniform and broad base support for the hull in the water, with their underlying surfaces being flat and horizontally disposed.

The third central hull is thought to provide additional stability in rough surface conditions or high wind conditions which may create an unstable situation for a hydroplane style boat. Additionally, a forwardly rising support structure for the sponsons is described which provides an upwardly and forwardly angled undersurface which is bounded by the central hull and the respective sponsons. This undersurface is used to compress an airstream received when the boat is in motion to provide aerodynamic lift force on the underside of the structure in addition to the hydrodynamic lift force generated on the hull when the boat is under power. The boat described in the referenced patent appears to be larger than 20 feet in length and has the cockpit positioned rearwardly with the engine placed in an opposing forward position.

Another differing style craft which is substantially aerodynamic in design while utilizing both aerodynamic and hydrodynamic lift forces during the transitional period from standstill through surface departure, is described in U.S. Pat. No. 3,190,582 and related U.S. Pat. Nos. 3,627,235 and 3,030,448. The aircraft disclosed therein is, at rest, supported on forwardly and outwardly extended sponsons joined to a central craft fuselage. The sponsons are joined to the fuselage by airfoil shaped structures or wings extending outwardly and downwardly to the sponsons from the fuselage to provide a reverse dihedral wing configuration. This design positions forward portions of the fuselage above the sponsons such that the forward portion of the fuselage cannot contact the surface of the water on which the craft is supported. The wing structures extend rearwardly from the outwardly and downwardly directed leading edge which extends substantially perpendicular with the longitudinal axis of the fuselage, to an inwardly swept back rearward converging at the tail of the fuselage. The rearward edge of the wing sections extend in a generally horizontal plane from the sponsons to the rear of the fuselage. This wing configuration provides a triangular shaped frontal opening from the nose of the fuselage to the interior side of each respective sponson to define an underlying space below the fuselage and wing structures which is closed at the rearward edge of the wing against the surface of the water. The rearward edge of the wing is generally at the same vertical height as the sponsons and meets the water surface at rest from the sponson to the rear of the fuselage. Thus at rest the craft rests on the sponsons and the rearward edge of the wing and the rearward end of the fuselage, all of which are in contact with the water to support the aircraft.

When the aircraft begins operation and accelerates, the air flow into the triangular shaped frontal opening of the wing begins to build air pressure under the aircraft, between the undersurface of the wings and fuselage and the surface of the water. Maximum aerodynamic pressure builds at the rearward edge of the wings so that the rear of the aircraft lifts from the surface of the water first and the aircraft is supported by hydrodynamic pressure on the sponsons and aerodynamic pressure along the rearward edge of the wings.

Operation of the aircraft as velocity increases becomes increasingly unstable however due to loss of aerodyanmic lift as the rear edges of the wings rise and the ram air and ground effects lift dissipate. This causes great difficulty in pitch or attitude control of the aircraft. Due to the reverse dihedral configuration of the wings roll of the craft in one direction or the other tends to increase rotation of the same direction. This is caused by increases lift on the rising (more horizontal) wing as compared to the other, a phenomena which additionally causes attitude and roll instability.

If the aircraft is piloted through the transitional period, the aircraft attains a stable and substantially horizontal pitch attitude and airflow over the wings generates aerodynamic lift to raise the craft from the water surface into free flight.

The aircraft fuselage is configured in a common design having the cockpit positioned as far forward as is practical in view of other major components contained in the fuselage, such as engine, avionics, etc. which are positioned in the nose structure of the craft.

A watercraft comprising a singular water borne hull which additionally utilizes a wing(s) for stability and control in operation is known as a Ski Plane ® which is manufactured by a concern known as Ski-Plane, Inc. of Newport Beach, Calif. The hull of the Ski Plane is a narrow cigar-shaped structure which has a primary substantially flat and narrow undersurface extending the length of the hull. A pair of secondary and adjacent horizontal undersurfaces are disposed on either side and are part of the hull, beginning with a raised surface portion approximately ⅓ along the length of the hull from the front and curved downwardly and rearwardly to a flat undersurface contiguous with the primary undersurface approximately midway along the length of the hull. The secondary undersurfaces are generally provided to aid high speed stability while decreasing the area of undersurface in contact with the water to reduce viscous drag.

A pair of wing structures extend laterally from the rear of the craft and exhibit a slight dihedral angle with the hull. Each wing structure ends with a downwardly curved portion or "drooping edge" which acts to restrict lateral flow of air from beneath the wing to improve stall characteristics, i.e. reduce the speed at which stall occurs. The wing structure ends do not, however, meet the water surface at level operation. Ailerons extend along the rearward edge of each wing structure to assist in rotational control of the craft when at speed. A fixed laterally extending winglet is also provided at the nose of the craft. The wing structures are thus characterized by a design common to an aircraft, rather than a waterborne vehicle.

The Ski Plane is powered by a typical outboard motor mounted to the transom of the hull to propel the craft and generate primary rotational control through a driving propeller disposed below the surface of the water. A pair of cockpits are provided in a generally forward position of the hull. Major control, fuel and drive components are mounted within the stern in the area where the wing structures are attached.

SUMMARY OF INVENTION

A pleasure watercraft is presented which comprises a central hull and a pair of laterally disposed sponsons which are mounted to the hull through support of wing structures. The watercraft design positions the pair of sponsons equidistantly and laterally from the watercraft central hull, and rearwardly from the bow. The wing structures have an aerodynamically configured shape to generate lift force to improve transitional and high speed performance of the watercraft. Preferably, the wing structures mounting the sponsons to the hull are configured to have the shape of an airfoil with a relatively large radius leading edge to improve low speed lift and stall characteristics. Also, the wing structures extend upwardly and outwardly from the central hull to define a dihedral angle with a horizontal plane of the craft to provide roll stability. The inside surface of each sponson provides a barrier which prevents lateral flow of air from under each of the respective wing structures to further reduce stall airspeed, and to permit efficient utilization of the forces generated beneath the wing structures from the force of airflow.

In a preferred embodiment, the central hull has a concave shaped undersurface which extends from the bow rearwardly underneath the craft to the stern to improve hydrodynamic lift. Each of the sponsons also have a concave shaped surface or inwardly formed scallop along its undersurface to improve performance and assist in obtaining directional stability of the watercraft. Preferably the concave undersurface of each sponson is directed slightly outwardly and downwardly from the center of the craft.

The airfoil shaped wing structures have a leading edge which extends from the bow of the central hull to the front of each respective sponson. Since the sponsons are positioned rearwardly from the bow, the leading edge defines a sweptback wing configuration from the front of the craft to the front of the sponsons. Each of the sponsons preferable end at an approximately lateral position with the stern of the central hull. The wing structures extend from the rear of each sponson to the stern of the hull to define a trailing edge substantially orthogonal with the longitudinal axis of the watercraft. Preferably, each of the wing structures exhibit a slightly outwardly and downwardly curved upper surface while maintaining a dihedral angle of the undersurface with respect to the hull, with the undersurface near the lateral end of each wing structure curving downwardly to blend into the interior wall of each sponson.

The watercraft is powered by a typical power plant which drives an air or water propulsion system to provide motive force. Additionally, typical aerodynamic and/or hydrodynamic (fluid) control means are provided to steer and control attitude of the craft.

The watercraft is designed to have a mass distribution which enables a pilot to control the attitude of the watercraft through the fluid control elements and the positioning of the pilots body within a cockpit contained in a central hull. A cockpit is formed along the longitudinal axis of the central hull preferably forward of the mid position to provide a seating position for a pilot. The mass distribution of the craft is designed such that the center of gravity of the craft lies within a longitudinal range beneath a seating position for a pilot in the cockpit. This permits the pilot to utilize body movement to control the attitude of the watercraft when is operation. The mass elements of the craft are distributed in the central hull to place the center of gravity within the defined longitudinal range below the seating position of the pilot. In a preferred configuration, the power plant is positioned in the nose or bow of the watercraft and the propulsion system is positioned in the stern. Drive means are provided extending below the seating position of the pilot to transfer power from the powerplant to the propulsion system. Fuel storage is preferably positioned immediately below the seating position of the pilot within the longitudinal range of the center of gravity so that fuel usage will not disturb the mass distribution of the watercraft.

The propulsion system is preferably a ducted fan position in the stern of the watercraft with an air intake immediately behind the seating position of the pilot in the cockpit. The ducted fan preferably includes torque control means to eliminate torque forces characteristic of the fan from acting on the watercraft. A rudder may be provided behind the outlet of the ducted fan to provide turning and yaw control. Additional horizontal control surfaces may be provided to obtain pitch control.

The watercraft is preferably constructed in a one piece structure from a structurally molded foam composition which comprises a tough outer surface for durability.

In operation as the watercraft accelerates hydrodynamic forces exerted against the forward portion of the central hull and against the sponsons pitch the craft upwardly. This raises the swept back leading edge of the wing sections supporting the sponsons to enlarge the frontal window between the undersurface of the wing sections and the surface of the water, while lowering the trailing edge of the wing sections close to or on the surface of the water to substantially close the passage for air at the trailing edge of each wing section. This forms an airpocket below each wing section which receives the airstream as the watercraft urges ahead to generate ram and ground effect lift on the under surface of each wing section. The center of the aerodynamic lift on the wing section is rearwardly positioned.

As the watercraft increases in speed and begins to plane on the surface of the water, the center of hydrodynamic lift moves rearwardly along the undersurface of the hull permitting the watercraft to decrease its upwardly pitched attitude and become more horizontally disposed. Aerodynamic lift at the rearward portions of the wing sections assist in decreasing the upward pitch of the craft. As the watercraft noses forward and the upward pitch decreases not only does the center of hydrodynamic lift move rearward on the undersurface of the hull but airflow is permitted over the wing sections as the trailing edge of each wing section lifts from the surface of the water. This generates aerodynamic lift force on the wing sections. The center of aerodynamic and/or ground effect force generated on each of the wing sections moves forwardly.

As the watercraft goes through transition and approaches operation speed the center of hydrodynamic lift force on the hull and the center of the aerodynamic and/or ground effect lift force on each of the wing sections converges longitudinally, i.e. the center of hydrodynamic force moves toward the rear of the craft and the center of aerodynamic and/or ground effect force moves toward the front of the craft, such that the summation of forces enters into the longitudinal range of the center of gravity of the craft. In other words viewing the longitudinal range of the center of gravity as bounded on a forward side by a first plane orthogonal along the longitudinal axis of the craft and bounded on the rearward side by a second plane orthogonal to said axis, the summed hydrodynamic and aerodynamic and/or ground effect forces will converge within the two bounding planes. Thus, when the watercraft is at speed not only is the center of gravity, which is the balance point of the craft, positioned within the defined longitudinal range at the center of gravity but the lift forces acting on the craft are also acting within this range to provide the pilot attitude control of the watercraft by shifting his weight with respect thereto. Attitude control is thus assisted by a pilot shifting their position in the cockpit, or leaning their body in a desired direction. This is possible because the longitudinal range bounding the center of gravity and lift forces is substantially within the seating position of the pilot in the craft and preferably with the fuel supply included so that the balance of forces is not upset by fuel usage. The pilot may thus shift his weight forward to nose the craft downwardly and shift his weight rearward to nose the craft upwardly. Additionally, since the center of gravity is positioned directly under the pilot, the pilot may lean to the left or right to rotate the craft to the left or right respectively. The watercraft may thus be controlled by the pilot through usage of the control elements of the watercraft, especially the rudder and/or horizontal stabilizers, and through shifting of their weight as is easily accomplished within the cockpit when the craft is in operation. Additionally power applied to the propulsion means can be utilized to control pitch of the craft.

BEST MODE OF THE INVENTION

Figure 1:
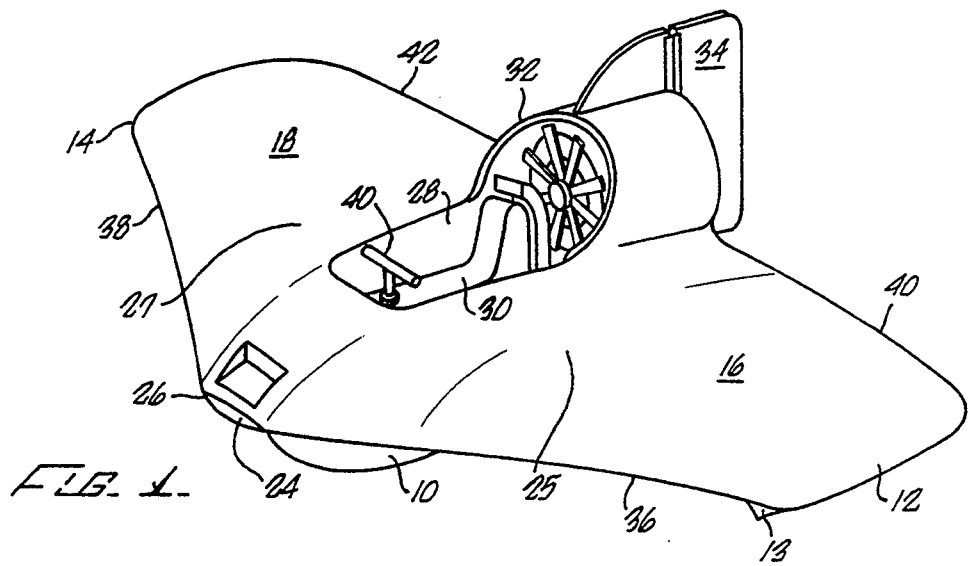
FIG. 1 is a downwardly directed perspective view of the presented watercraft from its left side.
Figure 2:
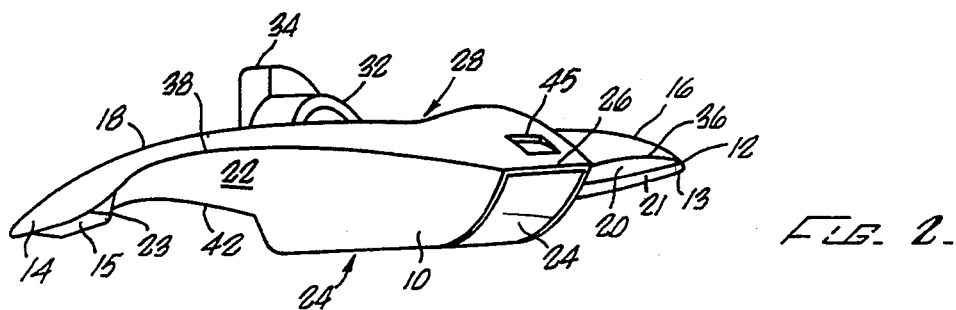
FIG. 2 is an upwardly directed perspective view of the presented watercraft from its right side.
Figure 3:
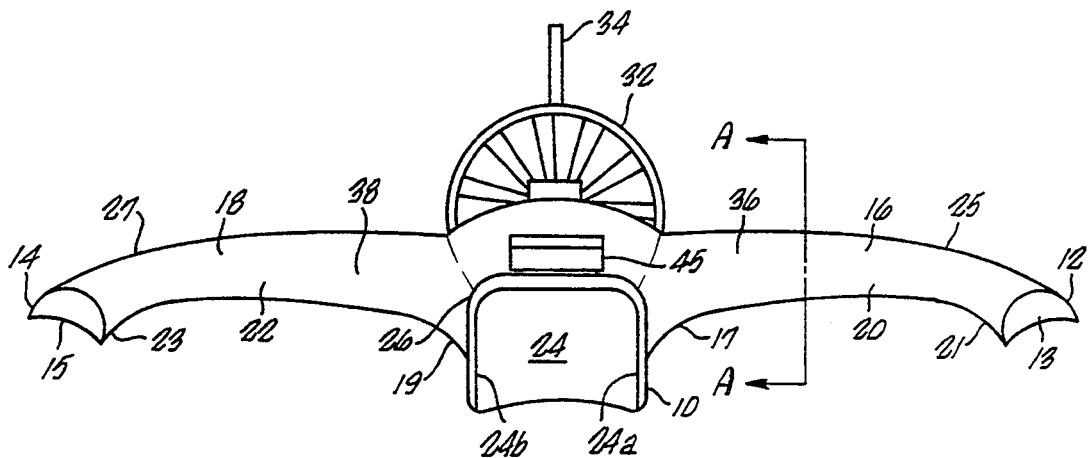
FIG. 3 is a frontal view of the presented watercraft showing the lateral configuration of the support structures for the sponsons.
Figure 4:
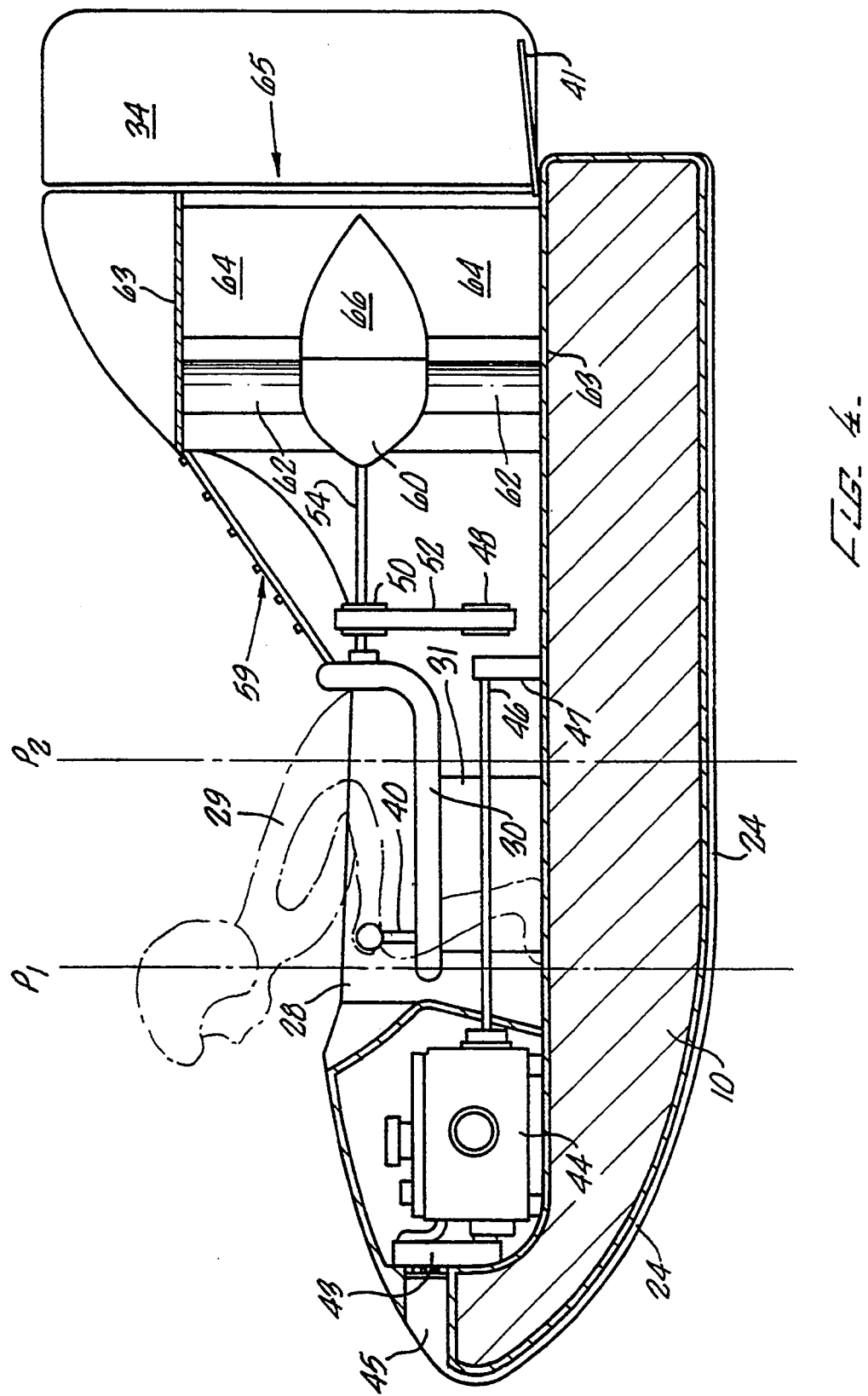
FIG. 4 is a section view through the longitudinal axis of the watercraft displaying the mass elements contained within the central hull in full view and a seating position for pilot with the pilots body indicated with a broken line.

The presented watercraft can be viewed in FIGS. 1 through 3. The watercraft comprises central hull 10 forming a central portion of the craft. A pair of laterally disposed sponsons 12 and 14 respectively are positioned in parallel relationship with the longitudinal axis of the hull and are mounted to the central hull 10 by outwardly directed support or wing structures 16 and 18 respectively. The sponsons 12 and 14 are preferably aligned rearwardly of the bow of the central hubs 10.

The wing structures 16 and 18 are identical in structure and configuration though the mirror image and will be described simultaneously with this understanding. The wing structures 16, 18 mounting their respective sponson 12, 14 extend from the side of the central hull 10 laterally to the sponson. The undersurface of the wing structure 16, 18 has an undersurface 20, 22 which is outwardly and upwardly directed to form a dihedral angle with a horizontal plane through the central hull 10 as it reaches out to its respected sponson 12, 14. Preferably the dihedral angle formed by the undersurfaces 20, 22 of the wing section 16, 18 is 10° relative to a horizontal plane through the central hull 10. The undersurfaces 20, 22 have a curved section 17, 19 to blend with the side surfaces of the central hull 10. At their outer end the undersurfaces 20, 22 have outwardly and downwardly curved section 21, 23 to form a "drooping edge" bounding the undersurfaces 20, 22 of the wing section 16, 18 and blend into interior side wall of each of the respective sponsons 12, 14. The upper side of each of the wing structures 16, 18 extend outwardly and curve downwardly to blend into each of the outer surfaces of the sponsons 12, 14 which they support. This wing structure design forms a smooth and continuous form for the upper and under surfaces which smoothly form into the supported sponsons 12, 14.

Figure 5:
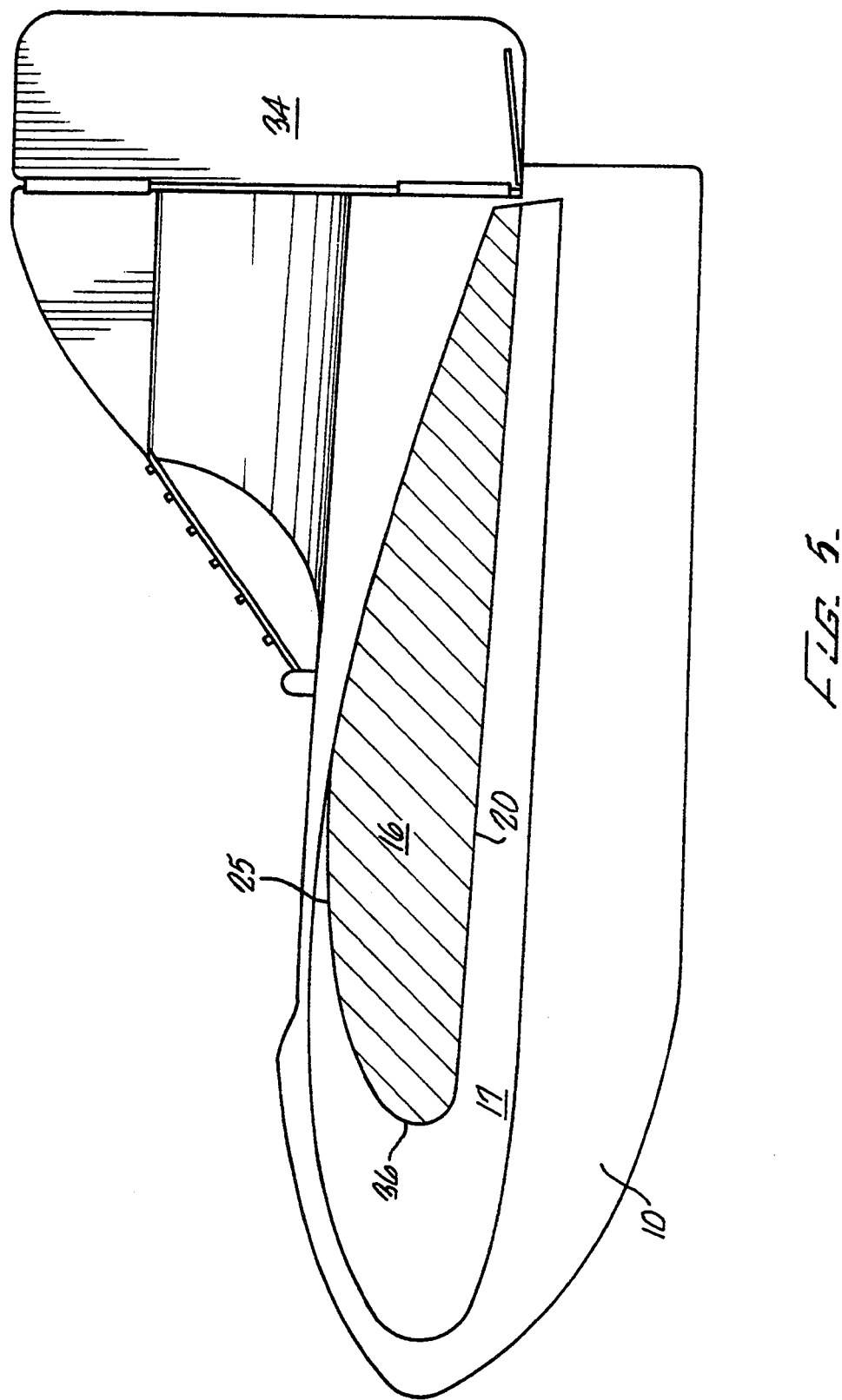
FIG. 5 is a side view of the central hull of the presented watercraft with a longitudinal section taken midway through the wing structures to show the aerodynamic shape thereof.

Each of the wing structures 16, 18 have an aerodynamically configured shape, i.e. have the shape of an airfoil. This can be clearly seen in the cross sectional view of FIG. 5 for a section A—A is taken through wing structure 16 to show the curved uppersurface 25 extending from front to the rear of the wing section and the substantially flat undersurface 20 extending from front to the rear of the wing section.

Referring again to FIGS. 1 through 3 the leading edges of each wing section 16 and 18 extend outwardly and rearwardly from the bow of the central hull 10 to the front of the rearwardly positioned sponsons 12, 14 respectively which they support. Each of the sponsons 12 and 14 respective are positioned parallel with the longitudinal axis of the central hull 10 and begin rearwardly of bow of the central hull 10 ending at a point substantially equal with the stern of the central hull 10. The leading edges of the wing section 16, 18 thus form a sweptback wing configuration from the bow of the central hull 10. Preferably, the leading edges 36, 38 of the wing section 16, 18 extend rearwardly with a 60° angle with the longitudinal axis of the central hull 10 the leading edges 36 and 38 respectively of the wing structures 16, 18 have a relatively large radius frontal surface, such as is shown in the cross section depicted in FIG. 5 for leading edge 36. The trailing edges 40 and 42 of the wing structures 16 and 18 respectively are generally narrow in width and extend perpendicularly to the rearward end of each sponson 12 and 14 to form a straight trailing edge.

In preferred form, the central hull 10 has a concavity 24 inwardly formed along the length of its undersurface. The concavity 24 rises forwardly and upwardly into the lower portions of the bow of the central hull 10 to form a forwardly directed concave surface at the frontal portion of the bow bounded by edges 24a and 24b respectively.

Similarly, each of the sponsons 12, 14 have a concave shaped undersurface 13 and 15 respectively formed along their length with a forwardly and upwardly curved portion to form a forwardly directed concave frontal surface. Preferably, the concavities 13 and 15 formed into sponsons 12 and 14 respective are slightly inwardly directed and preferably symmetrical about a plane formed an angle between 20° and 30° with vertical.

A cockpit 28 is formed in the upper surface of the central hull 10 and is positioned approximately ⅓ along the longitudinal length of the central hull from the bow to the rear. The cockpit 28 contains a seating position 30 for a pilot and also contains control elements, as for example steering handle 40. The upper surface of the bow of the central hull 10 is shown with an air inlet 42 formed to provide an airstream to radiator means (not shown) for cooling a power plant used to drive the watercraft.

A ducted fan 32 is positioned rearwardly of the cockpit 28 to provide motive force for propelling the watercraft a rudder 34 is positioned behind the outlet 65 of the ducted fan 32 to direct the airflow from the ducted fan to provide directional control for the watercraft. The ducted fan 32 has an inlet 59 behind the cockpit 28 to receive air which is compressed by the rotating fan blade 62 to force compressed air at high speed out of the ducted fan outlet 65. Horizontal airflow control elements may also be provided.

The mass distribution of the watercraft is designed so that the center of gravity of the craft lies within a longitudinal range along the longitudinal axis of the central hull 10, shown bounded by front plane P1 and rear plane P2 extending perpendicularly with the longitudinal axis of the craft. The seating position 30 of the pilot within the cockpit 28 of the central hull 10 is positioned substantially between the planes P1 and P2 thus positioning the driver 29 substantially within the range of the center of gravity is below the seating position 30 of the pilot 29 so that the pilot is seated over the center of gravity.

The mass elements mounted within central hull 10 are distributed within the hull to place the center of gravity within the defined longitudinal range between planes P1 and P2 and below the seating position of the pilot. The fuel tank 31 is positioned below the seating position 30 of the pilot 29 to provide fuel storage within the range of the center of gravity between planes P1 and P2 so that fuel usage will not affect balance of the craft. A power plant 44 is positioned forwardly of the cockpit 28 in the bow of the craft and lower than the seating position of the pilot 30. The power plant may be a typical multi-cylinder 2-cycle marine engine such is commonly known by those in the art. The ducted fan 32 is positioned in the stern of the craft and is mounted to direct thrust of the airflow which is generates over the surface of the water on which the craft is supported. The ducted fan 32 generally comprises a hub 60 which mounts a plurality of fan blades 62 radially around the hub 60. The fan blades 62 are bounded by a cylindrical wall or fan duct 63. A fairing 66 extend rearwardly from the hub 60 to provide a smooth surface over which the airflow compressed by the fan blades 62 may pass. A torque control means to correct torque force generated by thrust of the ducted fan 32 is provided, such as curved vanes 64 which slightly redirect the flow of air leaving the fan blades 62 as they are powered. The flow of air leaving the ducted fan passes by the rudder 34 for directional control.

Power from the power plant 44 is transmitted to rotate the ducted fan 32 through drive means comprising a first horizontally disposed shaft 46 extending below the seating position 30 of the driver and through a formed opening in the fuel tank 32. The shaft is mounted for rotation by suitable bearing support means such as the engine 44 and a bearing support 47. At the rearward end of the shaft 46 a pulley 48 is mounted to drive a fan shaft 54 through pulley 50 mounted on such shaft 54 with a belt 52 interconnecting the pulleys 48 and 50. The fan shaft 54 may support the ducted fan hub 60 and is mounted for rotation by suitable bearing support means (not shown). The power plant 44, the drive means comprising the shafts 46, 54 with the belt drive and the ducted fan 32 are all elements commonly known to those skilled in the art and can be selected from any one of a number of manufacturers. The power plant 44, the drive means and the ducted fan 32 are mounted within the hull 10 such that in combination with the mass of the hull, their individual masses combine to position the center of gravity for the watercraft within the longitudinal range between the planes P1 and P2 so that the seating position of the driver 30 is positioned above the center of gravity.

Control means are provided for controlling the speed of the engine 44 (not shown) and for controlling the rudder 34 such as through control handle 40 which communicates with the rudder 34 through a control linkage 41.

It should be noted that the central hull 10, the wing section 16 and 18 and the sponsons 12 and 14 may be made as a one-piece structure out of structural foam material which has a relatively tough outer surface. However, other material with are sufficiently light while rigid may be used such as fiberglass or other plastics or laminations as would be selected by those generally skilled in the art of watercraft hull design.

We claim:

1. A watercraft having an aerodynamic configuration comprising:
   a central hull;
   a pair of sponsons laterally positioned one on either side of said hull;
   support structures mounting such sponsons to said hull, said structures having a shape of an airfoil to provide a wing section on either side of said hull between said hull and said respective sponson, a forward underside of each said structures extending substantially upwardly and outwardly from said hull to form a dihedral angle therewith; and
   a cockpit for seating a pilot positioned along a longitudinal axis of said hull,
   the watercraft further having mass elements comprising:
   engine means for powering the watercraft;
   propulsion means for applying power of said engine means to propel the watercraft;
   drive means for transmitting power from said engine means to said propulsion means;
   fuel supply means including means for storing and means for supplying fuel to said engine means,
   said mass elements distributed with respect to said cockpit in said hull to locate the center of gravity of the watercraft within a select range along the longitudinal axis of said central hull in vertical alignment with a seating position of the pilot in said cockpit,
   wherein the central hull has a concave shaped undersurface.

2. A watercraft having an aerodynamic configuration comprising:
   a central hull;
   a pair of sponsons laterally positioned one on either side of said hull;
   support structures mounting such sponsons to said hull, said structures having a shape of an airfoil to provide a wing section on either side of said hull between said hull and said respective sponson, a forward underside of each said structures extending substantially upwardly and outwardly from said hull to form a dihedral angle therewith; and
   a cockpit for seating a pilot positioned along a longitudinal axis of said hull,
   the watercraft further having mass elements comprising:
   engine means for powering the watercraft;
   propulsion means for applying power of said engine means to propel the watercraft;
   drive means for transmitting power from said engine means to said propulsion means;
   fuel supply means including means for storing and means for supplying fuel to said engine means,
   said mass elements distributed with respect to said cockpit in said hull to locate the center of gravity of the watercraft within a select range along the longitudinal axis of said central hull in vertical alignment with a seating position of the pilot in said cockpit,
   wherein each of said sponsons has a concave shaped undersurface.

3. A watercraft having an aerodynamic configuration comprising:
   a central hull;
   a pair of sponsons laterally positioned one on either side of said hull;
   support structures mounting such sponsons to said hull, said structures having a shape of an airfoil to provide a wing section on either side of said hull between said hull and said respective sponson, a forward underside of each said structures extending substantially upwardly and outwardly from said hull to form a dihedral angle therewith; and
   a cockpit for seating a pilot positioned along a longitudinal axis of said hull,
   the watercraft further having mass elements comprising:
   engine means for powering the watercraft;
   propulsion means for applying power of said engine means to propel the watercraft;
   drive means for transmitting power from said engine means to said propulsion means;
   fuel supply means including means for storing and means for supplying fuel to said engine means,
   said mass elements distributed with respect to said cockpit in said hull to locate the center of gravity of the watercraft within a select range along the longitudinal axis of said central hull in vertical alignment with a seating position of the pilot in said cockpit,
   wherein each of said sponsons has a longitudinal concavity formed therein, said concavity formed upwardly and inwardly into said sponson.

4. A watercraft having an aerodynamic configuration comprising:
   a central hull;
   wing structures mounted on said and extending laterally outwardly therefrom, said wing structures having a shape of an airfoil to provide a wing section on either side of said hull;
   a cockpit for seating a pilot positioned along a longitudinal axis of said hull,
   said watercraft further having mass elements comprising:
   engine means for powering said watercraft;
   ducted fan means for applying power of said engine means by aerodynamic thrust to propel said watercraft;
   drive means for transmitting power from said engine means to said ducted fan means;
   fuel supply means for storing and supplying fuel to said engine means;
   said mass elements distributed with respect to said cockpit in said hull to locate the center of gravity of said watercraft within a select range along the longitudinal axis of said central hull in vertical alignment with the seating position of the pilot in said cockpit.

5. The watercraft of claim 4 wherein said cockpit is positioned along the longitudinal axis of said hull such that hydrodynamic lift generated on the undersurface of said central hull and aerodynamic lift generated on the undersurface of said wings converge as said watercraft accelerates to sum a center of lift on said watercraft substantially in lateral alignment with the longitudinal range of the center of gravity in vertical alignment with the seating position of a pilot or a pilot in said cockpit.

6. The watercraft of claim 4 whereby said fuel supply means is positioned under the seating position for the pilot in said cockpit within said select range along the longitudinal axis of said central hull.

7. The watercraft of claim 6 wherein said engine means is positioned forward of said cockpit in said central hull and said propulsion means is positioned rearward of said cockpit in said hull.

8. The watercraft of claim 7 wherein said cockpit is positioned approximately ⅓ of the total length of said central hull rearwardly from the bow.

9. The watercraft of claim 4 wherein the trailing edges of said wing structures are substantially perpendicular to the longitudinal axis of said central hull and are vertically positioned relative to the undersurfaces of central hull such as said watercraft begins motion and hydrodynamic force on said central hull pitches said watercraft into an ascending attitude, the trailing edges of said structure approaches the water surface and the leading edge of said structure rises from the water surface to form an air pocket under said structure laterally mounted by said central hull and said sponsons respectively, with a forwardly opening window which receives force of air as said watercraft accelerates to generate ground effect lift under said wing structures as said watercraft increase in speed.

10. The watercraft of claim 4 comprising a ground effect craft, wherein a leading edge of each said wing structures is swept rearwardly from said central hull to form a swept back wing section on either side of said hull extending outwardly therefrom.

11. The watercraft of claim 4 wherein said wing structures comprise an undersurface on each wing structure extending substantially upwardly and outwardly from said hull to form a dihedral angle with said hull.

12. A watercraft having an aerodynamic configuration comprising:
a central hull;
a pair of sponsons laterally positioned one on either side of said hull;
support structures mounting such sponsons to said hull, said structures having a shape of an airfoil to provide a wing section on either side of said hull between said hull and said respective sponson, a forward underside of each said structures extending substantially upwardly and outwardly from said hull to form a dihedral angle therewith; and
a cockpit for seating a pilot positioned along a longitudinal axis of said hull,
the watercraft further having mass elements comprising:
engine means for powering the watercraft;
propulsion means for applying power of said engine means to propel the watercraft;
drive means for transmitting power from said engine means to said propulsion means;
fuel supply means including means for storing and means for supplying fuel to said engine means,
said mass elements distributed with respect to said cockpit in said hull to locate the center of gravity of the watercraft within a select range along the longitudinal axis of said central hull in vertical alignment with a seating position of the pilot in said cockpit,
wherein said means for storing fuel is positioned under the seating position for a pilot in said cockpit,
said engine means is positioned forward of said cockpit in said central hull and said propulsion means is positioned rearward of said cockpit in said hull,
wherein said propulsion means is a ducted fan.

13. The watercraft of claim 12 wherein said ducted fan comprises torque control means for reducing the torque effect of said fan on the stern of said watercraft under power.

14. The watercraft of claim 13 additionally comprising a vertical rudder pivotally positioned behind the ducted fan.

15. The watercraft of claim 13 additionally comprising movable horizontal stabilizer means.

16. A watercraft having an aerodynamic configuration comprising:
a central hull having a hydrodynamic bottom surface for contacting the water;
a pair of wing structures laterally positioned one on either side of said hull, said structures having a shape of an airfoil to provide a wing section on either side of said hull; and
a cockpit for seating a pilot positioned along a longitudinal axis of said hull,
the watercraft further having mass elements comprising:
engine means for powering the watercraft;
propulsion means for applying power of said engine means to propel the watercraft;
drive means for transmitting power from said engine means to said propulsion means;
fuel supply means for storing and supply fuel to said engine means,
wherein said mass elements are distributed with respect to said cockpit in said hull to locate the center of gravity of the watercraft within a select range along the longitudinal axis of said central hull and in vertical alignment with and below the seating position of the pilot in said cockpit and
wherein said watercraft is constructed and arranged with a relative stability which permits attitude control by the pilot shifting body position within said cockpit.

17. A watercraft according to claim 16 wherein the select range for the center of gravity is generally centrally beneath a seating position for the pilot in said cockpit.

18. A watercraft according to claim 18 said engine means being positioned forward of said cockpit and said propulsion means being positioned rearward of said cockpit.

19. A watercraft having an aerodynamic configuration comprising:
a central hull;
a pair of wing structures laterally positioned one on either side of said hull, said structures having a shape of an airfoil to provide a wing section on either side of said hull; and
a cockpit for seating a pilot positioned along a longitudinal axis of said hull,
the watercraft further having mass elements comprising:
engine means for powering the watercraft;
propulsion means for applying power of said engine means to propel the watercraft;

drive means for transmitting power from said engine means to said propulsion means;

fuel supply means including means for storing and supply fuel to said engine means, wherein said mass elements are distributed with respect to said cockpit in said hull to locate the center of gravity of the watercraft within a select range along the longitudinal axis of said central hull and in vertical alignment with and below the seating position of the pilot in said cockpit and wherein said watercraft is constructed and arranged with a relative stability which permits attitude control by the pilot shifting body position within said cockpit, wherein said fuel storage means is positioned under a seating position for the pilot in said cockpit within said select range along the longitudinal axis of said central hull for minimizing disturbance of mass distribution due to fuel consumption.

20. A watercraft having an aerodynamic configuration comprising:

a central hull;

a pair of wing structures laterally positioned one on either side of said hull, said structures having a shape of an airfoil to provide a wing section on either side of said hull; and a cockpit for seating a pilot positioned along a longitudinal axis of said hull, the watercraft further having mass elements comprising:

engine means for powering the watercraft;

propulsion means for applying power of said engine means to propel the watercraft;

drive means for transmitting power from said engine means to said propulsion means;

fuel supply means including means for storing and supply fuel to said engine means, wherein said mass elements are distributed with respect to said cockpit in said hull to locate the center of gravity of the watercraft within a select range along the longitudinal axis of said central hull and in vertical alignment with and below the seating position of the pilot in said cockpit and wherein said watercraft is constructed and arranged with a relative stability which permits attitude control by the pilot shifting body position within said cockpit, wherein said watercraft is a ground effect craft, wherein a leading edge of each said wing structures is swept rearwardly from said central hull to form a swept back wing section on either side of said hull extending outwardly therefrom.

21. A watercraft having an aerodynamic configuration comprising:

a central hull;

wing structure extending laterally outwardly from either side of said central hull, said wing structure having a shape of an airfoil;

a cockpit for providing a seating position for a pilot positioned along a longitudinal axis of said central hull;

mass elements including:

engine means for powering the watercraft;

rotating fan for applying power of said engine means by aerodynamic thrust to propel the watercraft;

drive means for transmitting power from said engine means to said rotating fan;

fuel supply means for storing and supplying fuel to said engine means, wherein said mass elements are distributed with respect to said cockpit to locate a center of gravity of the watercraft along the longitudinal axis of said central hull within the seating position for the pilot, said engine means being positioned forward of said cockpit in said rotating fan being positioned rearward of said cockpit, wherein said fuel supply means is located under the seating position for the pilot along the longitudinal axis of said central hull.

* * * * *

UNITED STATES PATENT AND TRADEMARK OFFICE
CERTIFICATE OF CORRECTION

PATENT NO. : 5,357,894

DATED : Oct. 25, 1994

INVENTOR(S) : Clayton J. Jacobson

It is certified that error appears in the above-identified patent and that said Letters Patent is hereby corrected as shown below:

In column 2, line 17, change "3,030,448" to --3,830,448--.

In column 6, line 43, change "the" to read --of--.

In column 7, line 43, change "respective" to read --respectively--.

In column 8, line 44, change "32" to --31--.

In column 14, line 35, change "in" to --and--.

Signed and Sealed this

Seventh Day of March, 1995

Attest:

BRUCE LEHMAN

Attesting Officer

Commissioner of Patents and Trademarks